United States Patent
Nakahira et al.

(10) Patent No.: US 11,350,343 B2
(45) Date of Patent: May 31, 2022

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Koichi Ishihara, Musashino (JP); Mamoru Akimoto, Musashino (JP); Takafumi Hayashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/969,085

(22) PCT Filed: Feb. 12, 2019

(86) PCT No.: PCT/JP2019/004888
§ 371 (c)(1),
(2) Date: Aug. 11, 2020

(87) PCT Pub. No.: WO2019/159898
PCT Pub. Date: Aug. 22, 2019

(65) Prior Publication Data
US 2021/0037448 A1    Feb. 4, 2021

(30) Foreign Application Priority Data
Feb. 13, 2018    (JP) .............................. JP2018-023543

(51) Int. Cl.
*H04W 48/02* (2009.01)
*H04W 48/16* (2009.01)
(Continued)

(52) U.S. Cl.
CPC ........... *H04W 48/02* (2013.01); *H04W 48/16* (2013.01); *H04W 88/06* (2013.01); *H04W 88/10* (2013.01)

(58) Field of Classification Search
CPC ..... H04W 48/02; H04W 48/16; H04W 88/06; H04W 88/10; H04W 28/0215; H04W 48/18; H04W 84/12; H04W 48/20
See application file for complete search history.

(56) References Cited

U.S. PATENT DOCUMENTS

2013/0130617 A1    5/2013 Tamura
2018/0146467 A1*   5/2018 Kim ...................... H04W 80/02

FOREIGN PATENT DOCUMENTS

| JP | 2012015898 A | 1/2012 |
| JP | 2013110478 A | 6/2013 |

(Continued)

OTHER PUBLICATIONS

IEEE Standards Association, "Part 11: Wireless LAN Medium Access Control (MAC) and Physical Layer (THY) Specifications", IEEE Computer Society, Std 802.11ac-2016, Dec. 2016, New York, New York.

*Primary Examiner* — Diane D Mizrahi
(74) *Attorney, Agent, or Firm* — Timothy D. MacIntyre (57) ABSTRACT

[Problem] In a terminal station and a base station, in which a plurality of wireless communication units supporting different communication performances are mounted, it is possible to select and switch wireless communication unit which responds to a congested condition of wireless communication and a wireless communication quality, and further improves a wireless resource usage efficiency.
[Solution] A wireless communication units individually supporting a plurality of communication performances and selecting a wireless communication unit with respect to a terminal station that has made a connection request according to a communication performance of the terminal station, wherein the base station includes a control unit that is configured to hold, for each of the wireless communication units, terminal station connection permission information (Continued)

| WIRELESS PERFORMANCE INFORMATION OF TERMINAL STATION 100 | | WIRELESS UNIT 13-1 | ... | WIRELESS UNIT 13-r |
|---|---|---|---|---|
| STANDARD | 802.11a | P | ... | N |
| | 802.11a/n | P | ... | N |
| | 802.11a/n/ac | P | ... | P |
| | OTHERS | P | ... | N |
| NUMBER OF MAXIMUM STREAMS | 1 | P | ... | N |
| | 2 | P | ... | P |
| | EQUAL TO OR GREATER THAN 3 | N | ... | P |
| MAXIMUM BANDWIDTH | 20MHz | P | ... | N |
| | 40MHz | P | ... | P |
| | EQUAL TO OR GREATER THAN 80 MHz | N | ... | P |
| ⋮ | ⋮ | ⋮ | ⋮ | ⋮ |

P: PERMITTED
N: NOT PERMITTED indicating a permission condition as to whether permission of the connection request of the terminal station be granted according to the communication performance, to collate the communication performance of the terminal station with the terminal station connection permission information of the wireless communication unit to which the connection request was made, to establish a wireless connection with the terminal station in a case where the communication performance of the terminal station matches the permission condition, and, in a case where the communication performance does not match the permission condition, to direct the terminal station to another wireless communication unit whose permission condition matches the communication performance of the terminal station.

10 Claims, 9 Drawing Sheets (51) Int. Cl.
*H04W 88/06* (2009.01)
*H04W 88/10* (2009.01)

(56) References Cited

FOREIGN PATENT DOCUMENTS

| | | |
|---|---|---|
| JP | 2014212533 A | 11/2014 |
| WO | WO-2018084632 A1 | 5/2018 |

* cited by examiner

| WIRELESS PERFORMANCE INFORMATION OF TERMINAL STATION 100 | | WIRELESS UNIT 13-1 | ... | WIRELESS UNIT 13-r |
|---|---|---|---|---|
| STANDARD | 802.11a | P | ... | N |
| | 802.11a/n | P | ... | N |
| | 802.11a/n/ac | P | ... | P |
| | OTHERS | P | ... | N |
| NUMBER OF MAXIMUM STREAMS | 1 | P | ... | N |
| | 2 | P | ... | P |
| | EQUAL TO OR GREATER THAN 3 | N | ... | P |
| MAXIMUM BANDWIDTH | 20MHz | P | ... | N |
| | 40MHz | P | ... | P |
| | EQUAL TO OR GREATER THAN 80 MHz | N | ... | P |
| ⋮ | ⋮ | ⋮ | ⋮ | ⋮ |

P: PERMITTED
N: NOT PERMITTED

Fig. 3

| ITEM | WIRELESS PERFORMANCE INFORMATION OF TERMINAL STATION |
|---|---|
| STANDARD | 802.11a/n |
| NUMBER OF MAXIMUM STREAMS | 2 |
| MAXIMUM BANDWIDTH | 40MHz |
| ⋮ | ⋮ |

Fig. 4

| WIRELESS CONFIGURATION ITEM OF WIRELESS UNIT | WIRELESS UNIT 13-1 | ... | WIRELESS UNIT 13-r |
|---|---|---|---|
| PRIMARY CHANNEL | 36 | ... | 52 |
| MAXIMUM BANDWIDTH (MHz) | 40 | ... | 80 |
| TRANSMISSION POWER (dBm) | 23 | ... | 20 |
| ERROR CORRECTION CODE | LDPC VALID | ... | LDPC VALID |
| MAXIMUM MCS | 9 | ... | 9 |
| NUMBER OF MAXIMUM TRANSMISSION STREAMS | 2 | ... | 2 |
| NUMBER OF MAXIMUM RECEPTION STREAMS | 2 | ... | 2 |
| SHORT GI | INVALID | ... | VALID |
| TRANSMISSION DIVERSITY | VALID | ... | VALID |
| MULTI-USER MIMO | INVALID | ... | VALID |
| NUMBER OF MAXIMUM A-MDPU AGGREGATIONS | 20 | ... | 60 |
| ⋮ | ⋮ | ⋮ | ⋮ |

| ITEM | WIRELESS UNIT 13-1 | ... | WIRELESS UNIT 13-r |
|---|---|---|---|
| RECEPTION POWER | EQUAL TO OR GREATER THAN -85 dBm | ... | EQUAL TO OR GREATER THAN -70 dB |
| RECEPTION SNR | EQUAL TO OR GREATER THAN 3 dB | ... | EQUAL TO OR GREATER THAN 15 dB |
| ERROR RATE | EQUAL TO OR LESS THAN TOTAL 100% | ... | EQUAL TO OR LESS THAN TOTAL 20% |
| ⋮ | ⋮ | ⋮ | ⋮ |

Fig. 7

| | |
|---|---|
| RECEPTION POWER (dBm) | −65(10)、−70(90) |
| RECEPTION SNR (dB) | 30(10)、25(90) |
| NUMBER OF TRANSMISSION ANTENNAS | 1(100) |
| NUMBER OF RECEPTION ANTENNAS | 1(100) |
| NUMBER OF RECEPTION ANTENNAS (MHz) | 80(23)、40(62)、20(15) |
| TRANSMISSION POWER (dBm) | 14(10)、11(90) |
| ERROR CORRECTION CODE | Conv.(80)、L D C P (20) |
| M C S | 9(10)、8(10)、7(10)、…、1(8) |
| NUMBER OF TRANSMISSION STREAMS | 1(100) |
| SHORT GI | False(100) |
| TRANSMISSION DIVERSITY | False(100) |
| MULTI-USER MIMO | False(100) |
| NUMBER OF A-MDPU AGGREGATIONS | 1(50)、2(15)、3(10)、… |

Fig. 8

Fig. 9

WIRELESS COMMUNICATION SYSTEM AND WIRELESS COMMUNICATION METHOD

CROSS-REFERENCE TO RELATED APPLICATIONS

This application is a 371 U.S. National Phase of International Application No. PCT/JP2019/004888, filed on Feb. 12, 2019, which claims priority to Japanese Application No. 2018-023543, filed on Feb. 13, 2018. The entire disclosures of the above applications are incorporated herein by reference.

TECHNICAL FIELD

The present disclosure relates to a wireless communication system and a wireless communication method in which a base station includes a plurality of wireless communication units individually supporting a plurality of communication performances and selects a wireless communication unit according to the communication performance and a wireless communication quality with respect to a terminal station to which a connection request is made.

BACKGROUND ART

In a high-speed wireless access system based on an IEEE 802.11a standard or an IEEE 802.11g standard, an Orthogonal Frequency Division Multiplexing (OFDM) modulation scheme is used in a 2.4 GHz band or a 5 GHz band, and thus characteristics in a multipath fading environment are stabilized, thereby realizing a transmission rate up to 54 Mbit/s.

In addition, in a high-speed wireless access system based on an IEEE 802.11n standard, a Multiple Input Multiple Output (MIMO) for performing space division multiplexing on the same wireless channel with a plurality of antennas in the 2.4 GHz band or the 5 GHz band and a channel bonding technology for using a frequency channel of 40 MHz by simultaneously using two frequency channels of 20 MHz are used, thereby realizing a transmission rate up to 600 Mbit/s.

In addition, in a high-speed wireless access system based on an IEEE 802.11ac standard, a channel bonding technology for using a frequency channel up to 160 MHz by simultaneously using eight frequency channels of 20 MHz and a multi-user MIMO technology for simultaneously transmitting different signals to a plurality of destinations using the same wireless channel in the 5 GHZ band are used, thereby realizing wireless communication faster in speed and more efficient than the IEEE 802.11n standard (see, for example, Non Patent Literature 1).

In addition, the standards are drafted for a high-speed wireless access system using radio waves in the 2.4 GHz band or the 5 GHz band, while expanding former standards to support backward compatibility, and thus a large number of products are provided with compatibility with an existing standard as well as the newest standard. Therefore, it is possible for a wireless station corresponding to the newest standard and a wireless station corresponding to only the existing standard to communicate with each other.

In addition, the number of cases is increasing where the plurality of wireless communication units, which have different frequencies and communication standards, are mounted in the base station and the terminal station. In a wireless LAN of an IEEE 802.11 standard, a device corresponding to two frequencies in the 2.4 GHz band and the 5 GHz band is commonly used. Furthermore, various wireless communication units, which include wireless communication in a 60 GHz band, a Bluetooth (trade name) standard using the 2.4 GHz band, an IoT related standard such as Lora (trade name), and a sensor system standard such as Zigbee (trade name), are mounted, and respective wireless communication units have different wireless communication performances and wireless propagation characteristics.

CITATION LIST

Non Patent Literature

Non Patent Literature 1: IEEE Std 802.11ac-2016, December 2016.

SUMMARY OF THE INVENTION

Technical Problem

In a base station and a terminal station, in which a plurality of wireless communication units supporting different communication performances, such as a frequency and a communication standard, are mounted, it is desired to select an optimal wireless communication unit which responds to a congested condition of wireless communication or a wireless communication quality. In addition, even while being wirelessly connected, it is desired to switch to the optimal wireless communication unit according to deterioration or variation in the wireless communication quality.

However, in the wireless communication unit with backward compatibility in the communication standard, a wireless resource usage efficiency of a whole wireless communication system deteriorates in a case where the wireless connection in conformity to a communication standard in which a maximum bandwidth is narrow is unconditionally admitted. For example, even in a case where a maximum bandwidth of the wireless communication unit in the base station is 160 MHz, corresponding to an IEEE 802.11a/n/ac communication standard, a set bandwidth may not be utilized sufficiently and the wireless resource usage efficiency may deteriorate when a terminal station having a maximum bandwidth up to 40 MHz is wirelessly connected to the wireless communication unit that conforms to an IEEE 802.11a/n communication standard. In this case, from the viewpoint of improving the wireless resource usage efficiency, it is effective to separately use the plurality of wireless communication units according to the communication standard or the maximum bandwidth. In addition, in a case where the wireless communication quality greatly deteriorates, it is necessary to control the wireless communication unit, including whether the wireless communication be continued.

An object of the present disclosure is to provide a wireless communication system and a wireless communication method which enables selecting and switching the wireless communication units which respond to a congested condition of wireless communication and a wireless communication quality, and further improves a wireless resource usage efficiency in the base station and the terminal station, in which the plurality of wireless communication units with different communication performances are mounted.

Means for Solving the Problem

According to a first aspect of the disclosure, there is provided a wireless communication system in which a base station includes a plurality of wireless communication units individually supporting a plurality of communication performances and selecting a wireless communication unit with respect to a terminal station that has made a connection request according to a communication performance of the terminal station, wherein the base station includes a control unit that is configured to hold, for each of the wireless communication units, terminal station connection permission information indicating a permission condition as to whether permission of the connection request of the terminal station be granted according to the communication performance, to collate the communication performance of the terminal station with the terminal station connection permission information of the wireless communication unit to which the connection request was made, to establish a wireless connection with the terminal station in a case where the communication performance of the terminal station matches the permission condition, and, in a case where the communication performance does not match the permission condition, to direct the terminal station to another wireless communication unit whose permission condition matches the communication performance of the terminal station.

In the wireless communication system according to the first aspect of the disclosure, the control unit includes functions of holding wireless connection continuation information indicating a continuation condition as to whether the wireless connection be continued according to a wireless communication state between the wireless communication unit and the terminal station, collating the wireless communication state with the wireless connection continuation information, continuing the wireless connection in a case where the wireless communication state matches the continuation condition, and, in a case where the wireless communication state does not match the continuation condition, directing the terminal station to another wireless communication unit whose continuation condition matches the wireless communication state. The control unit further includes a function of selecting whether the wireless connection be continued or disconnected with the wireless communication unit which is being wirelessly connected, in a case where another wireless communication unit whose continuation condition matches the wireless communication state does not exist.

In the wireless communication system according to the first aspect of the disclosure, the terminal station holds the wireless connection continuation information, and the terminal station actively performs continuation control of the wireless connection in the base station.

According to a second aspect of the disclosure, there is provided a wireless communication method, in which a base station includes a plurality of wireless communication units individually supporting a plurality of communication performances and selecting a wireless communication unit with respect to a terminal station that has made a connection request according to a communication performance of the terminal station, the method including controlling, by the base station, to hold, for each of the wireless communication units, terminal station connection permission information indicating a permission condition as to whether permission of the connection request of the terminal station be granted according to the communication performance, to collate the communication performance of the terminal station with the terminal station connection permission information of the wireless communication unit to which the connection request was made, to establish a wireless connection with the terminal station in a case where the communication performance of the terminal station matches the permission condition, and, in a case where the communication performance does not match the permission condition, to direct the terminal station to another wireless communication unit whose permission condition matches the communication performance of the terminal station.

In the wireless communication method according to the second aspect of the disclosure, the method includes controlling, by the base station, to hold wireless connection continuation information indicating a continuation condition as to whether the wireless connection be continued according to a wireless communication state between the wireless communication unit and the terminal station, to collate the wireless communication state with the wireless connection continuation information, to continue the wireless connection in a case where the wireless communication state matches the continuation condition, and, in a case where the wireless communication state does not match the continuation condition, to direct the terminal station to another wireless communication unit whose continuation condition matches the wireless communication state. The method includes further controlling, by the base station, to select whether the wireless connection be continued or disconnected with the wireless communication unit which is being wirelessly connected, in a case where another wireless communication unit whose continuation condition matches the wireless communication state does not exist.

In the wireless communication method according to the second aspect of the disclosure, the terminal station holds the wireless connection continuation information, and the terminal station actively performs continuation control of the wireless connection in the base station.

Effects of the Invention

According to the present disclosure, it is possible to improve wireless resource usage efficiency in such a way that a base station separately uses a plurality of wireless communication units according to wireless performances of a terminal station, where the plurality of wireless communication units have different wireless performances. In addition, even in a case where a wireless communication quality greatly deteriorates, it is possible to switch the wireless communication unit with which wireless communication can be continued.

DESCRIPTION OF EMBODIMENTS

First Example

Figure 1:
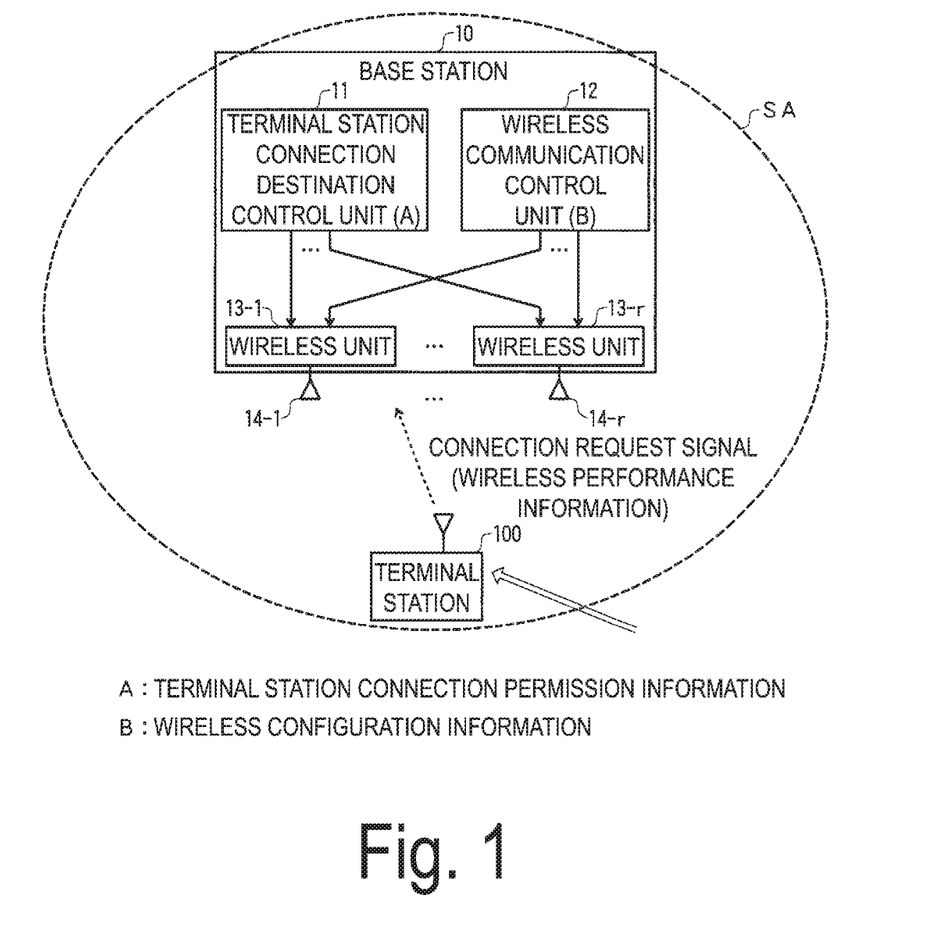
FIG. 1 is a diagram illustrating a configuration example of a first example of a wireless communication system according to the present disclosure.

FIG. 1 illustrates a configuration example of a first example of a wireless communication system of the present disclosure.

In FIG. 1, the wireless communication system includes a base station 10 and a terminal station 100 which exists in a service area SA that is a range within which performing wireless communication with the base station 10 is possible. The base station 10 includes a terminal station connection destination control unit 11, a wireless communication control unit 12, a plurality of wireless units 13-1 to 13-$r$ ($r$ is an integer which is equal to or greater than 2), and antenna elements 14-1 to 14-$r$. Note that, although a total number of the antenna elements 14-1 to 14-$r$ of the base station 10 are $r$ for the respective wireless units 13-1 to 13-$r$, and one antenna element is provided to the terminal station 100, the present disclosure is not limited thereto. For example, the same antenna element 14 may be shared by the plurality of wireless units of the wireless units 13-1 to 13-$r$, or one wireless unit 13 may include the plurality of antenna elements 14.

The wireless units 13-1 to 13-$r$ are each independently capable of performing the wireless communication with the wirelessly connected terminal station 100, a wireless unit to be connected to the terminal station 100 is selected in accordance with the terminal station connection permission information A which is configured by the terminal station connection destination control unit 11, and a parameter for wireless communication with the terminal station 100 is configured in accordance with the wireless configuration information B which is configured by the wireless communication control unit 12.

Figure 2:
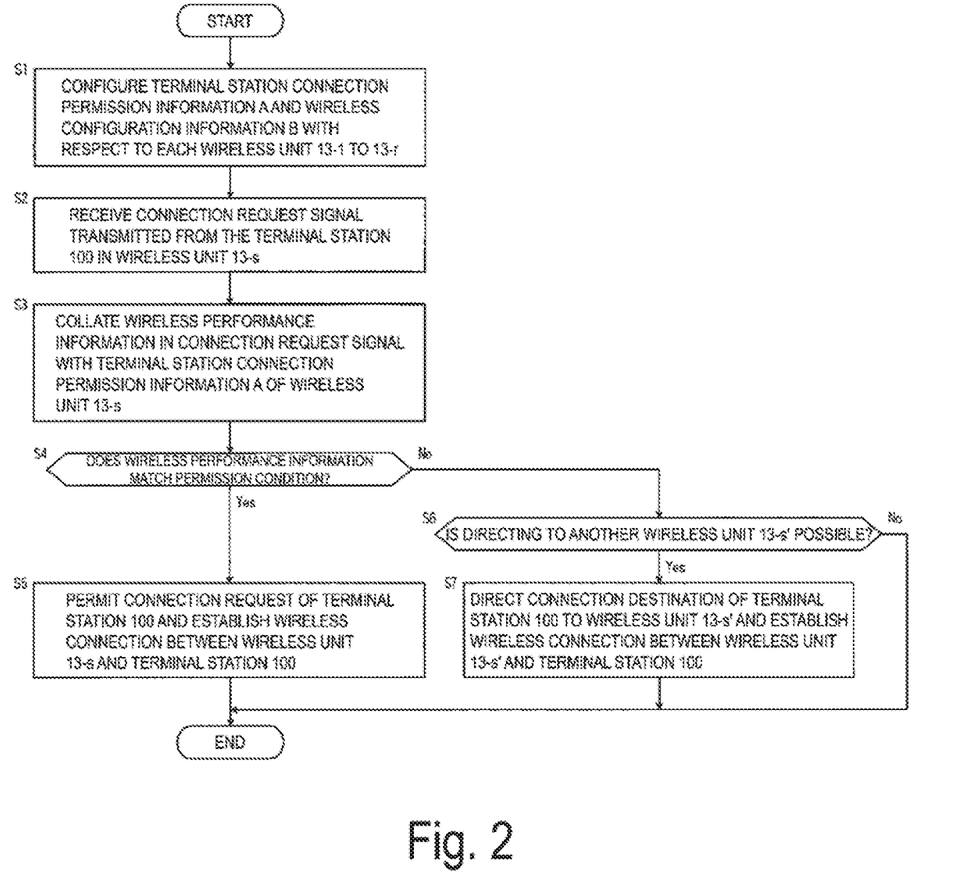
FIG. 2 is a flowchart illustrating an example of a wireless connection control processing procedure of a base station 10 in the first example.

FIG. 2 illustrates an example of a wireless connection control processing procedure of the base station 10 in the first example. Here, a procedure is illustrated in which one terminal station 100 moves from an outside to an inside of the service area SA, and the base station 10 performs wireless connection in response to a connection request from the terminal station 100. Note that, similarly, the same procedures are each independently performed, even in a case where a plurality of terminal stations 100 exist.

Figure 3:
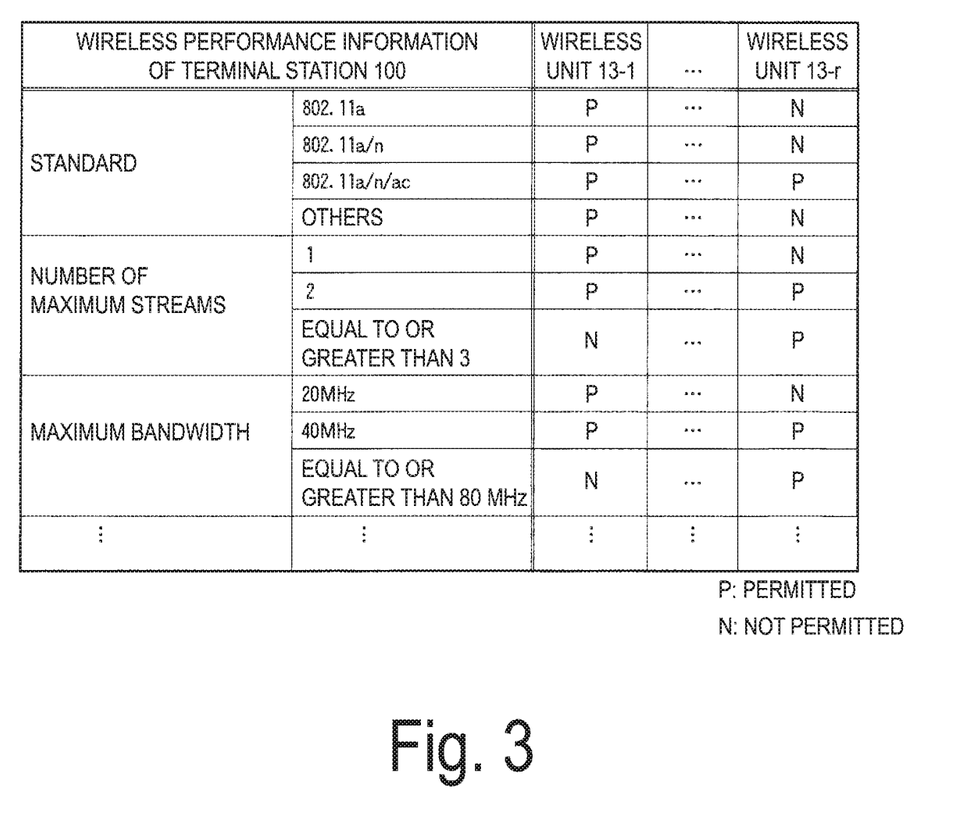
FIG. 3 is a diagram illustrating an example of terminal station connection permission information A.
Figure 4:
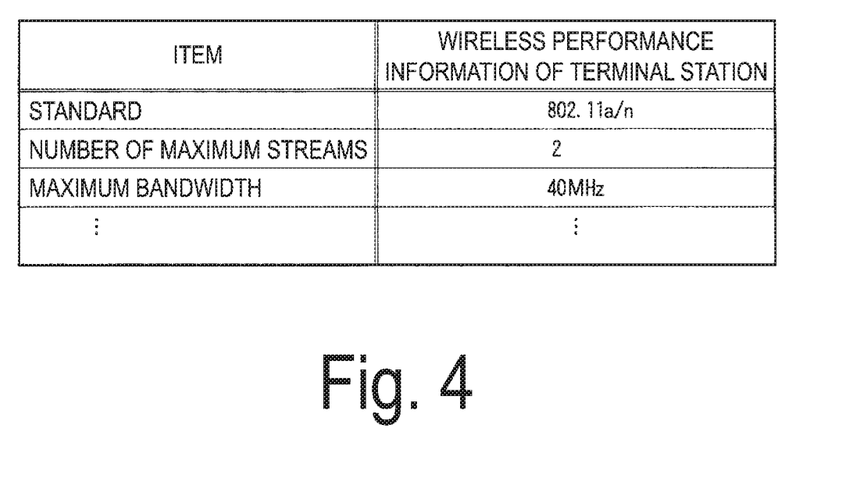
FIG. 4 is a diagram illustrating an example of wireless performance information of a terminal station 100.
Figure 5:
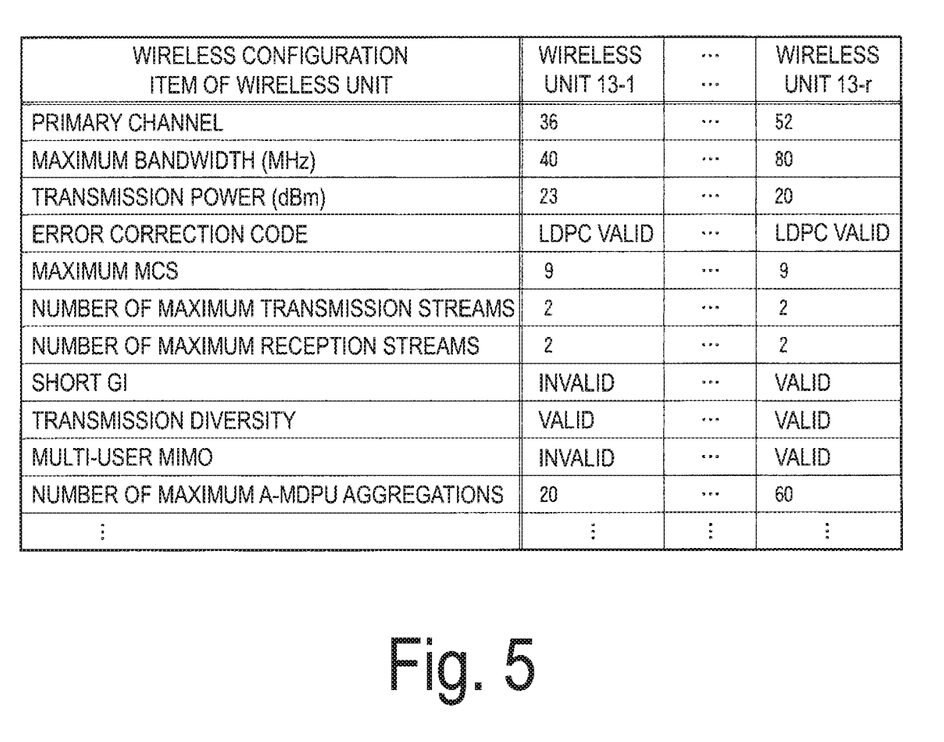
FIG. 5 is a diagram illustrating an example of wireless configuration information B.

In FIG. 1 and FIG. 2, the base station 10 configures the terminal station connection permission information A and the wireless configuration information B for each of the wireless units 13-1 to 13-$r$ (step S1). The terminal station connection permission information A is a permission condition indicating whether permission to the connection request (permitted P, not permitted N) be granted in a case where each of the wireless units 13-1 to 13-$r$ receives a connection request signal, which includes wireless performance information, from the terminal station 100. FIG. 3 and FIG. 4 illustrate examples of the terminal station connection permission information A of the wireless units 13-1 to 13-$r$ and the wireless performance information of the terminal station 100. The wireless configuration information B is a parameter used in a case of the wireless communication, and FIG. 5 illustrates an example of the wireless configuration information B.

For example, FIG. 3 illustrates a case where the wireless units 13-1 and 13-$r$ have the backward compatibility and support any of the IEEE 802.11a/n/ac standards, but, regarding to the wireless unit 13-$r$, even though the wireless unit 13-$r$ is capable of performing connection to the terminal station of the IEEE 802.11a and IEEE 802. 11a/n standards and the maximum bandwidth of 20 MHz, the connection request of such terminal station is not permitted (N). Thus, with respect to the connection request from the terminal station 100 having the wireless performance information shown in FIG. 4, the connection to the wireless unit 13-1 is permitted (P) but the connection to the wireless unit 13-$r$ is not permitted (N). In addition, in the example of FIG. 3, for the wireless unit 13-$r$, the connection request from the terminal station 100 of the maximum bandwidth (for example, 160 MHz), which is equal to or greater than 80 MHz, is permitted (P). And the maximum bandwidth configured is 80 MHz in the example of FIG. 5. This indicates that, even in a case where the connection request from the terminal station 100 is permitted, the maximum bandwidth in the wireless connection is 80 MHz.

In a case where the terminal station 100 senses that it has entered the inside of the service area SA from the outside, the terminal station 100 selects one wireless unit 13-$s$ from among the wireless units 13-1 to 13-$r$ which are included in the base station 10, and transmits the connection request signal to the wireless unit 13-$s$. As a sensing method, the terminal station 100 may receive a beacon frame transmitted by the base station 10 or receive a probe response frame transmitted by the base station 10 in response to a probe request frame transmitted by the terminal station 100, or the terminal station 100 may perform sensing using positional information of the terminal station 100. In addition, as a method for selecting the wireless unit 13-$s$, the wireless unit 13-$s$ may be selected based on the beacon frame or the probe request frame which is received by the terminal station 100, the wireless unit 13-$s$ may be selected, which is different from a wireless unit 13-$x$, to which wireless connection has been failed in previous wireless connection attempt to the base station 10, or may be randomly selected.

In the base station 10, the connection request signal transmitted from the terminal station 100 is received by the wireless unit 13-$s$ (step S2). Subsequently, the base station 10 collates the wireless performance information included in the received connection request signal with the terminal station connection permission information A of the wireless unit 13-$s$ which has received the connection request (step S3). In a case where the wireless performance information of the terminal station 100 matches the permission condition of the terminal station connection permission information A of the wireless unit 13-$s$ (Yes in step S4), the base station 10 permits the connection request of the terminal station 100 and establishes the wireless connection between the wireless unit 13-$s$ and the terminal station 100 (step S5).

On the other hand, in a case where the wireless performance information of the terminal station 100 does not match the permission condition of the terminal station connection permission information A of the wireless unit 13-$s$ (No in step S4), the base station 10 determines whether to perform directing to another wireless unit 13-$s'$ whose permission condition matches the wireless performance information of the terminal station 100 (step S6). Here, the case where the base station 10 enters directing processing with respect to the terminal station 100 is a case where the base station 10 has a function of directing to another wireless unit, the terminal station 100 has a reception function of being directed to the other wireless unit, and the wireless unit 13-$s'$, whose permission condition matches the wireless performance information of the terminal station 100, exists.

In a case where the terminal station 100 having wireless performance information shown in FIG. 4 performs the connection request to the wireless unit 13-$r$, the request to the wireless unit 13-$r$ is not permitted, and the terminal station 100 is directed to the wireless unit 13-1 as another wireless unit 13-$s'$ whose permission condition matches. In a case where it is possible to perform directing to the other wireless unit 13-$s'$ whose permission condition matches (Yes in step S6), a connection destination of the terminal station 100 is directed to the wireless unit 13-$s'$, and a wireless connection between the wireless unit 13-$s'$ and the terminal station 100 is established (step S7).

On the other hand, in a case where it is not possible to perform directing to the other wireless unit 13-$s'$ (No in step S6), the processing as the base station 10 ends. However, the terminal station 100 determines whether to attempt the wireless connection to the same base station 10 again by specifications, transmits the connection request signal to, for example, a wireless unit which is different from the previous wireless unit 13-$s$ in a case where the wireless connection is attempted to the same base station 10 again, and the base station 10 enters the processing from step S2. On the other hand, for example, in a case where the wireless connection request with respect to the same base station 10 fails a plurality of times and thus the terminal station 100 does not perform the wireless connection with respect to the same base station 10 again, a wireless connection processing ends.

By the above-described control flow, when the terminal station 100 performs the wireless connection with respect to the base station 10, the base station 10 can select the wireless unit 13-$s$ which is a connection destination for the terminal station 100 based on the permission condition of the terminal station connection permission information A which is configured in the base station 10. For example, in a case where a maximum bandwidth of 20 MHz is not permitted for the wireless unit 13-$r$ as the permission condition of the terminal station connection permission information A, the wireless connection is not performed between the terminal station 100 of the maximum bandwidth of 20 MHz and the wireless unit 13-$r$, and thus it is possible to avoid deterioration in a wireless resource usage efficiency. Note that, in this case, it is possible to respond to the connection request in a case where the terminal station 100 can be directed to the wireless unit 13-1 whose permission condition matches the wireless performance information of the terminal station 100.

Figure 6:
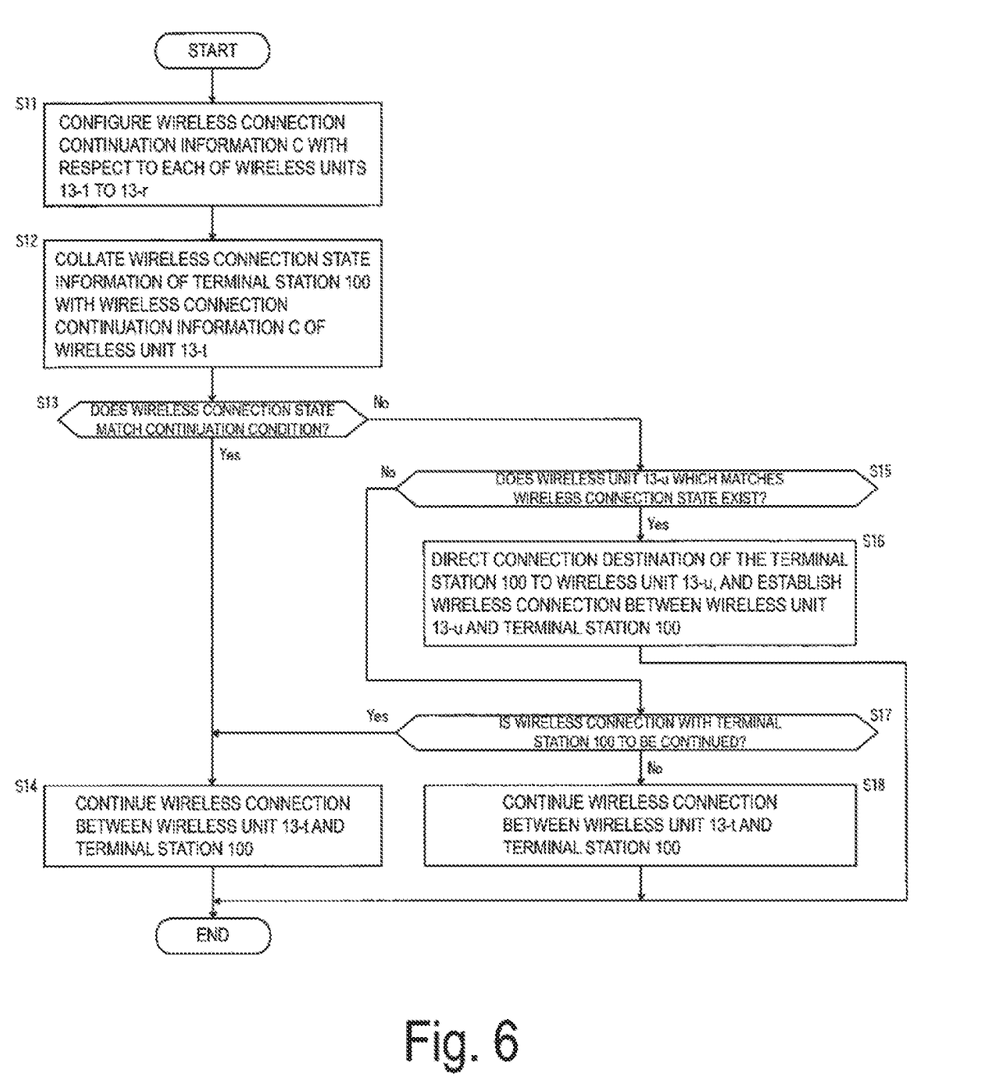
FIG. 6 is a flowchart illustrating an example of a wireless connection continuation control processing procedure of the base station 10 in the first example.

FIG. 6 illustrates an example of a wireless connection continuation control processing procedure of the base station 10 in the first example. Here, a procedure is illustrated in which the communication quality deteriorates in a state in which the base station 10 and the terminal station 100 establish the wireless connection, and the connection destination is switched from the wireless unit 13-$t$, which is a wireless connection destination of the terminal station 100, to another wireless unit 13-$u$. Note that, similarly, even in the case where the plurality of terminal stations 100 is present, the same procedures are independently performed.

Figure 7:
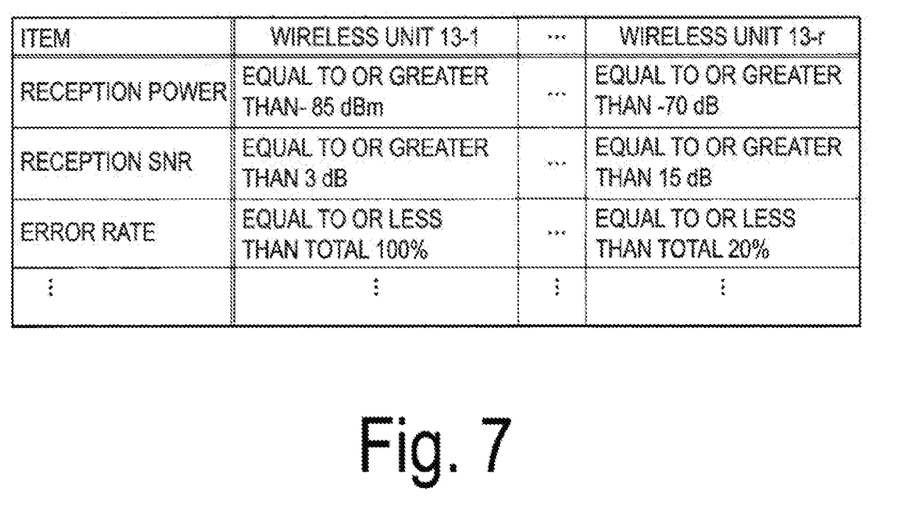
FIG. 7 is a diagram illustrating an example of wireless connection continuation information C.
Figure 8:
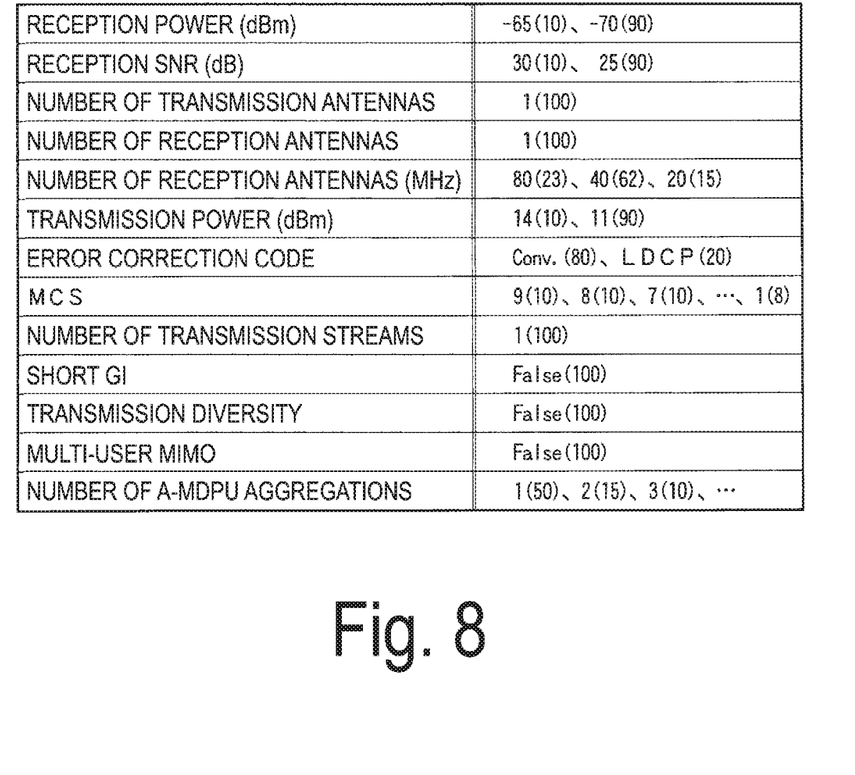
FIG. 8 is a diagram illustrating an example of wireless connection state information between a wireless unit 13-*t* and the terminal station 100.

In FIG. 1 and FIG. 6, the base station 10 configures wireless connection continuation information C with respect to each of the wireless units 13-1 to 13-$r$ (step S11). The wireless connection continuation information C is a continuation condition for continuing the wireless connection between each of the wireless units 13-1 to 13-$r$ and the terminal station 100 whose wireless connection has been established, and FIG. 7 illustrates an example thereof. For example, the wireless unit 13-1 continues the wireless connection in a case where reception power is equal to or larger than −85 dBm, and the connection destination is switched in a case where the reception power is less than −85 dBm. The base station 10 holds wireless connection state information indicating the wireless connection state between the wireless unit 13-$t$ and the terminal station 100, which are currently connected, and FIG. 8 illustrates an example thereof.

Subsequently, the base station 10 collates the wireless connection state information between the wireless unit 13-$t$ and the terminal station 100 with the wireless connection continuation information C which is configured to the wireless unit 13-$t$ (step S12), and, in a case where the wireless connection state information in the wireless unit 13-$t$ matches the continuation condition of the wireless connection continuation information C (Yes in step S13), continues the wireless connection between the wireless unit 13-$t$ and the terminal station 100 (step S14).

On the other hand, in a case where the wireless connection state information in the wireless unit 13-$t$ does not match the continuation condition of the wireless connection continuation information C (No in step S13), it is determined whether the wireless unit 13-$u$ other than the wireless unit 13-$t$ exists, where the wireless connection state information of the wireless unit 13-$u$ matches the continuation condition of the wireless connection continuation information C (step S15). Here, the base station 10 receives and acquires the probe request frame or another wireless signal, which is transmitted by the terminal station 100, in the wireless unit 13-$u$ as wireless connection state information between the wireless unit 13-$u$ and the terminal station 100, and the base station 10 estimates wireless connection state information between the wireless unit 13-$u$ and the terminal station 100 from the wireless connection state information between the wireless unit 13-$t$ and the terminal station 100.

In a case where the wireless unit 13-$u$ whose wireless connection state information matches the continuation condition of the wireless connection continuation information C exists (Yes in step S15), the base station 10 performs directing such that the wireless connection destination of the terminal station 100 is switched from the wireless unit 13-$t$ to the wireless unit 13-$u$, and establishes the wireless connection between the wireless unit 13-$u$ and the terminal station 100 (step S16). As a switching method, the wireless connection between the terminal station 100 and the wireless unit 13-$t$ may be disconnected, thereafter, control described with reference to FIG. 2 when the wireless connection is established to the terminal station 100 may be performed, or the terminal station 100 may be instructed to connect to the wireless unit 13-$u$ through the wireless communication.

On the other hand, in a case where the wireless unit 13-$u$ whose wireless connection state information matches the continuation condition of the wireless connection continuation information C does not exist (No in step S15), it is determined whether priority to hold the wireless connection between the wireless unit 13-$t$ and the terminal station 100 be granted, that is, whether the wireless connection is continued as an exception (step S17). In a case where the wireless connection is continued (Yes in step S17), the wireless connection between the wireless unit 13-$t$ and the terminal station 100 is continued (step S14). On the other hand, in a case where the wireless connection is not continued (No in step S17), the wireless connection with the terminal station 100 is disconnected (step S18). Note that, as a method for disconnecting the wireless connection with the terminal station 100, disconnection control may be performed from a side of the base station 10 such as transmitting a wireless disconnection signal to the terminal station 100, or the wireless connection may be disconnected from a side of the terminal station 100 such as not providing a response with respect to the wireless signal from the terminal station 100.

According to the above-described control flow, even after the wireless connection between the base station 10 and the terminal station 100 is established, it is possible to switch from the wireless unit 13-*t*, which is being wirelessly connected to the terminal station 100, to the other wireless unit 13-*u*, or to disconnect the wireless connection with the terminal station 100, based on the continuation condition of the wireless connection continuation information C which is configured in advance on the side of the base station 10. The processing is performed at each predetermined timing, or when a large variation or deterioration occurs as the wireless connection state between the base station 10 and the terminal station 100 is checked periodically, and thus it is possible to control the wireless connection with the terminal station 100 based on the wireless connection continuation information C configured to each of the wireless units 13-1 to 13-*r*.

According to the control processing procedure and the configuration of the apparatus of the first example which is described hereinabove, in a case where the terminal station 100 establishes the wireless connection with the base station 10 based on the terminal station connection permission information A or the wireless connection continuation information C, which is configured to the wireless units 13-1 to 13-*r* in advance by the base station 10, it is possible to perform wireless connection destination control of the terminal station 100 by selecting the wireless units 13-1 to 13-*r* which serves as the wireless connection destination, switching the wireless connection destination from the wireless unit 13-*t* to the wireless unit 13-*u* after the terminal station 100 establishes the wireless connection with the base station 10, or disconnecting the wireless connection.

In this manner, in a case where the terminal station 100 enters the service area SA, it is possible to perform communication by selecting an appropriate wireless unit 13-*s* of the base station 10 according to the wireless performance information of the terminal station 100, and it is possible to use limited wireless communication resources effectively. In addition, in a case where the communication quality deteriorates or in a case where the terminal station 100 leaves the service area SA, the wireless unit of the connection destination may be appropriately switched or the communication may be disconnected according to the wireless connection continuation information C of the wireless unit 13-*t* and thus a situation in which the wireless communication is continued in a low-quality communication and low-speed state can be avoided.

Second Example

In the wireless connection continuation control of the base station 10 in the first example shown in FIG. 6, the base station 10 performs control of: configuring the wireless connection continuation information C to each of the wireless units 13-1 to 13-*r* from the terminal station connection destination control unit 11; and, when the communication quality with the terminal station 100 deteriorates and does not match the continuation condition of the wireless connection, continuing the wireless connection by switching to the other wireless unit 13-*u* that matches the continuation condition, exceptionally holding the wireless connection with the wireless unit 13-*t*, or disconnecting the communication, based on the wireless connection continuation information C of the wireless unit 13-*t* which is being wirelessly connected to the terminal station 100.

In a second example, the control of wireless connection continuation between the base station 10 and the terminal station 100 is performed on the side of the terminal station 100. To do so, the wireless connection continuation information C is configured to the terminal station 100, through the wireless unit 13-*t* which is being wirelessly connected to the terminal station 100, and the processing subsequent to step S12 illustrated in FIG. 6 is actively performed by the terminal station 100. That is, in a case where the communication quality with the wireless unit 13-*t* of the base station 10 deteriorates and does not match the continuation condition of the wireless connection, the terminal station 100 performs control of, based on the wireless connection state information of the terminal station 100 itself and the wireless connection continuation information C, continuing the wireless connection by switching to another wireless unit 13-*u* which matches the continuation condition, exceptionally holding the wireless connection with the wireless unit 13-*t*, or disconnecting the communication.

Third Example

Figure 9:
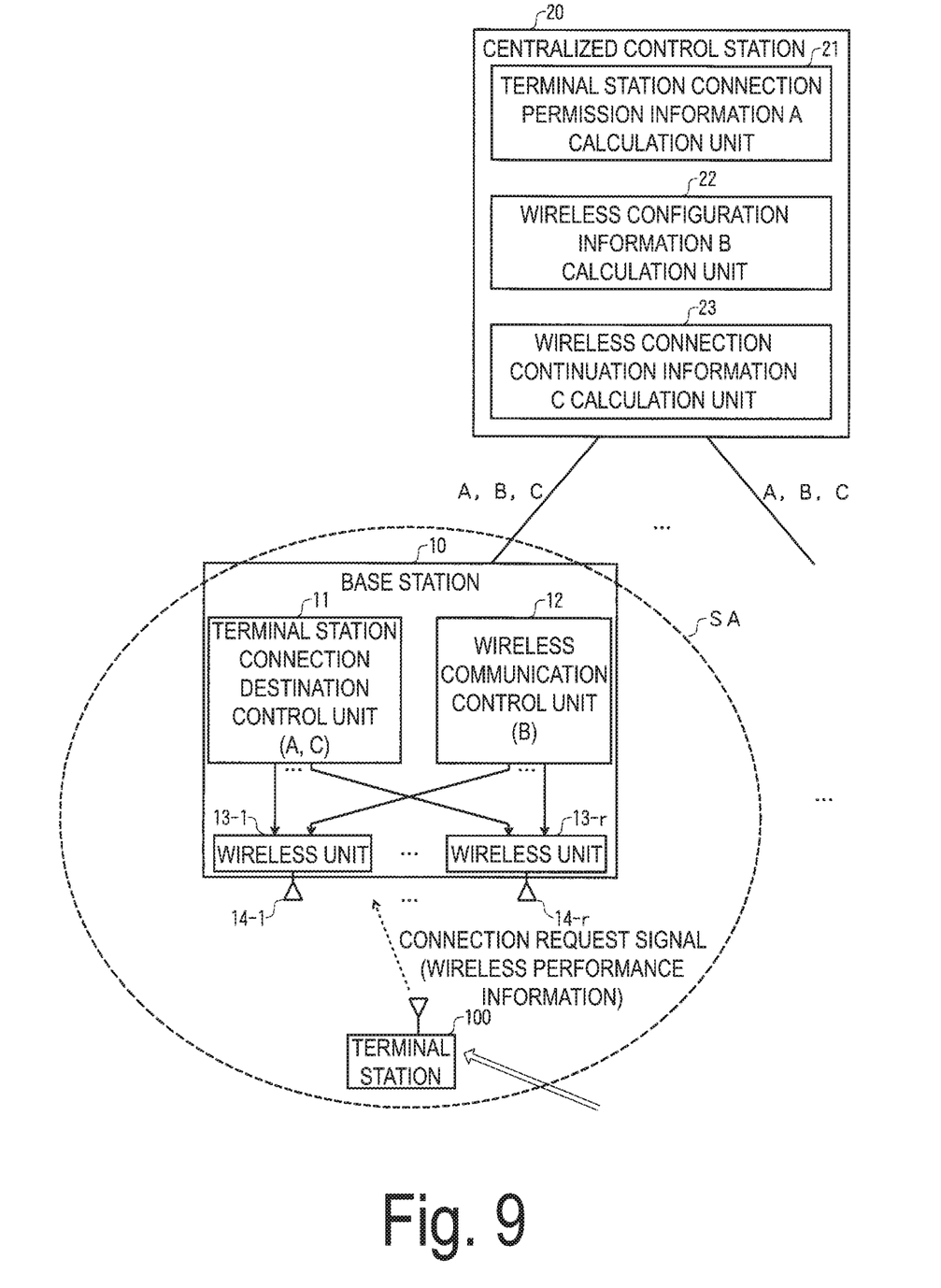
FIG. 9 is a diagram illustrating a configuration example of a third example of the wireless communication system according to the present disclosure.

FIG. 9 illustrates a configuration example of a third example of the wireless communication system of the present disclosure.

In FIG. 9, a characteristic of the third example is a configuration in which the number of base stations 10 and service areas SA of the first example illustrated in FIG. 1 is more than one, and a centralized control station 20 at an upper level is connected to each of the base stations 10 through a network. The centralized control station 20 includes a terminal station connection permission information A calculation unit 21, a wireless configuration information B calculation unit 22, and a wireless connection continuation information C calculation unit 23 which respectively calculate the terminal station connection permission information A (FIG. 3), the wireless configuration information B (FIG. 5), and the wireless connection continuation information C (FIG. 7) which are configured to the wireless units 13-1 to 13-*r* of each of the base stations 10. The terminal station connection permission information A, the wireless configuration information B, and the wireless connection continuation information C, which are calculated for each base station 10, are respectively notified to the corresponding base station 10.

Each base station 10 acquires the terminal station connection permission information A, the wireless configuration information B, and the wireless connection continuation information C, which are calculated by the centralized control station 20; respectively configures the terminal station connection permission information A and the wireless connection continuation information C to the wireless units 13-1 to 13-*r* from the terminal station connection destination control unit 11, and respectively configures the wireless configuration information B to the wireless units 13-1 to 13-*r* from the wireless communication control unit 12. The wireless connection destination control thereafter is the same as the processing procedure subsequent to step S2 of the first example shown in FIG. 2, and the wireless connection continuation control is the same as the processing procedure subsequent to step S12 of the first example shown in FIG. 6.

Fourth Example

In a fourth example, in the configuration of the wireless communication system of the third example illustrated in FIG. 9, the wireless connection continuation control of the base station 10 and the terminal station 100 is performed on the side of the terminal station 100, similar to the second example. To do so, the wireless connection continuation information C acquired from the centralized control station 20 is configured to the terminal station 100, through the wireless unit 13-t which is being wirelessly connected to the terminal station 100, and the processing subsequent to step S12 illustrated in FIG. 6 is actively performed by the terminal station 100. That is, in a case where the communication quality with the wireless unit 13-t of the base station 10 deteriorates and does not match the continuation condition of the wireless connection, the terminal station 100 performs control of: continuing the wireless connection by switching to another wireless unit 13-u which matches the continuation condition, exceptionally holding the wireless connection with the wireless unit 13-t, or disconnecting the communication, based on the wireless connection state information of the terminal station 100 itself and the wireless connection continuation information C.

The following is a summary of the above-described first to fourth examples.

(1) Wireless connection destination control based on the terminal station connection permission information A (FIG. 3)

First and Second Examples

The terminal station connection permission information A is configured in the base station 10, and the base station 10 selects a wireless unit to be connected.

Third and Fourth Examples

The terminal station connection permission information A calculated by the centralized control station 20 is configured to the base station 10, and the wireless unit to which the base station 10 connects is selected.

(2) Wireless connection continuation control based on wireless connection continuation information C (FIG. 7)

First Example

The wireless connection continuation information C is configured in the base station 10, and the base station 10 controls the continuation of the wireless connection.

Second Example

The wireless connection continuation information C calculated by the base station 10 is configured to the terminal station 100, and the terminal station 100 controls the continuation of the wireless connection.

Third Example

The wireless connection continuation information C calculated by the centralized control station 20 is configured to the base station 10, and the base station 10 controls the continuation of the wireless connection.

Fourth Example

The wireless connection continuation information C calculated by the centralized control station 20 is configured to the terminal station 100 through the base station 10, and the terminal station 100 controls the continuation of the wireless connection.

REFERENCE SIGNS LIST

10 Base Station
11 Terminal Station Connection Destination Control Unit
12 Wireless Communication Control Unit
13 Wireless Unit
14 Antenna Element
20 Centralized Control Station
21 Terminal Station Connection Permission Information A Calculation Unit
22 Wireless Configuration Information B Calculation Unit
23 Wireless Connection Continuation Information C Calculation Unit
100 Terminal Station
SA Service Area

The invention claimed is:

1. A wireless communication system in which a base station comprises:
 a plurality of wireless communication units individually supporting a plurality of communication performances and selecting a wireless communication unit with respect to a terminal station that has made a connection request according to a communication performance of the terminal station,
 wherein the base station includes a control unit that is configured to store, for each of the wireless communication units, terminal station connection permission information indicating a permission condition as to whether permission of the connection request of the terminal station be granted according to the communication performance, where the connection permission information varies across the wireless connection units and includes at least one of an identifier for a wireless communication standard, a maximum number of data stream and a maximum bandwidth; to receive the connection request from the terminal station; and in response receiving the connection request, to collate the communication performance of the terminal station with the terminal station connection permission information of the wireless communication unit to which the connection request was made,
 wherein the control unit is further configured to establish a wireless connection with the terminal station in a case where the communication performance of the terminal station matches the permission condition, and, in a case where the communication performance does not match the permission condition, to direct the terminal station to another wireless communication unit whose permission condition matches the communication performance of the terminal station.

2. The wireless communication system according to claim 1,
 wherein the control unit includes functions of holding wireless connection continuation information indicating a continuation condition as to whether the wireless connection be continued according to a wireless communication state between the wireless communication unit and the terminal station, collating the wireless communication state with the wireless connection continuation information, continuing the wireless connection in a case where the wireless communication state matches the continuation condition, and, in a case where the wireless communication state does not match the continuation condition, directing the terminal station to another wireless communication unit whose continuation condition matches the wireless communication state.

3. The wireless communication system according to claim 2,
wherein the control unit further includes a function of selecting whether the wireless connection be continued or disconnected with the wireless communication unit which is being wirelessly connected, in a case where another wireless communication unit whose continuation condition matches the wireless communication state does not exist.

4. The wireless communication system according to claim 3,
wherein the terminal station holds the wireless connection continuation information, and the terminal station actively performs continuation control of the wireless connection in the base station.

5. The wireless communication system according to claim 2
wherein the terminal station holds the wireless connection continuation information, and the terminal station actively performs continuation control of the wireless connection in the base station.

6. A wireless communication method, in which a base station includes a plurality of wireless communication units individually supporting a plurality of communication performances and selecting a wireless communication unit with respect to a terminal station that has made a connection request according to a communication performance of the terminal station, the method comprising:
Storing, by the base station, for each of the wireless communication units, terminal station connection permission information indicating a permission condition as to whether permission of the connection request of the terminal station be granted according to the communication performance, where the connection permission information varies across the wireless connection units and includes at least one of an identifier for a wireless communication standard, a maximum number of data stream and a maximum bandwidth;
receiving, by the base station, the connection request from the terminal station;
in response receiving the connection request, collating, by the base station, the communication performance of the terminal station with the terminal station connection permission information of the wireless communication unit to which the connection request was made,
establishing, by the base station, a wireless connection with the terminal station in a case where the communication performance of the terminal station matches the permission condition, and
directing, by the base station, the terminal station to another wireless communication unit whose permission condition matches the communication performance of the terminal station in a case where the communication performance does not match the permission condition, to direct.

7. The wireless communication method according to claim 6,
wherein the method includes controlling, by the base station, to hold wireless connection continuation information indicating a continuation condition as to whether the wireless connection be continued according to a wireless communication state between the wireless communication unit and the terminal station, to collate the wireless communication state with the wireless connection continuation information, to continue the wireless connection in a case where the wireless communication state matches the continuation condition, and, in a case where the wireless communication state does not match the continuation condition, to direct the terminal station to another wireless communication unit whose continuation condition matches the wireless communication state.

8. The wireless communication method according to claim 7,
wherein the method includes further controlling, by the base station, to select whether the wireless connection be continued or disconnected with the wireless communication unit which is being wirelessly connected, in a case where another wireless communication unit whose continuation condition matches the wireless communication state does not exist.

9. The wireless communication method according to claim 8,
wherein the terminal station holds the wireless connection continuation information, and the terminal station actively performs continuation control of the wireless connection in the base station.

10. The wireless communication method according to claim 7,
wherein the terminal station holds the wireless connection continuation information, and the terminal station actively performs continuation control of the wireless connection in the base station.

* * * * *